April 5, 1927.  R. W. SMITH  1,623,365
NUT LOCK
Filed April 3, 1926
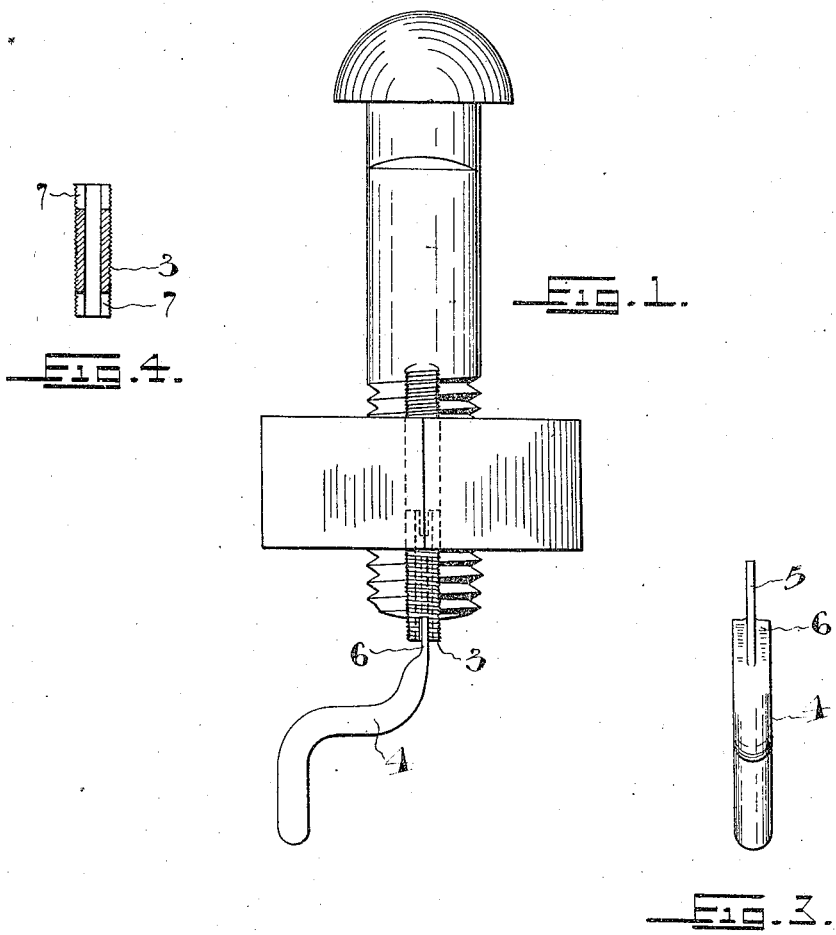
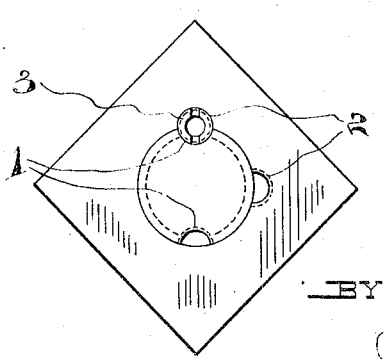
INVENTOR.
R. W. Smith.
BY J. Edward Maybee
ATTY Patented Apr. 5, 1927.

1,623,365

UNITED STATES PATENT OFFICE.

RUFUS W. SMITH, OF TORONTO, ONTARIO, CANADA.

NUT LOCK.

Application filed April 3, 1926, Serial No. 99,556, and in Canada March 9, 1926.

This invention relates to improvements in nut locks particularly adapted for railway use, though applicable also for locking nuts to bolts of any type. Briefly my invention comprises a bolt and a nut having grooves therein adapted to be brought into co-operative relationship to form circular key seats, the grooves being threaded so that a cylinder key may be screwed therein. By employing two grooves in one part, angularly spaced 90° from one another, and two grooves in the other, diametrically opposite one another, an adjustment of one-quarter turn of the nut is provided for. The invention is illustrated in the accompanying drawings in which Fig. 1 is a side elevation, partly in section, of a bolt and nut provided with my improved lock;

Fig. 2 an end elevation of the same;

Fig. 3 an end elevation of the key tool; and

Fig. 4 a longitudinal section of the key.

In the drawings like numerals of reference indicate corresponding parts in the different figures.

The bolt will be in all respects of the usual construction for the purpose for which it is intended. It is, however, provided at opposite sides with longitudinal semi-circular grooves 1. These are shown as arranged diametrically opposite one another. The nut also is of ordinary type suited for the bolt with which it is used and this nut is provided with grooves 2 in its internal periphery arranged to form with either of the grooves one complete keyseat of circular section. The grooves 2 are preferably arranged at right angles to one another. The same result, however, could be obtained by making the grooves 1 at right angles to one another and the grooves 2 diametrically opposite. It will be noted that by turning the nut through angles of 90° that one of the grooves 1 will always be in alinement with one of the grooves 2.

A key 3 is provided which may be fitted into the keyseats formed by co-acting grooves 1 and 2. This key is threaded and the keyseats are correspondingly threaded. As the different positions of the keyseats are at right angles to one another, that is, one-quarter of a revolution, it will be necessary that the threads of the key and the keyseats should be of one-quarter the pitch of the threads of the bolt itself, as otherwise the threads in one of the grooves 2 would not mesh perfectly when turned from one of the grooves 1 to the next adjacent groove 1.

Ordinarily there is little possibility of the key shaking loose, but for further security its threads may be pitched in the opposite direction to the threads of the bolt. As the bolts are usually provided with right hand threads, the key will in that case be provided with a left hand thread. It will be evident that it is not essential that both the grooves 1 and 2 should be threaded, as good results can be obtained by threading only one set of grooves, though, it will usually be more satisfactory to thread both.

It will be seen from the construction described that I have provided means whereby the nut may be locked to the bolt in positions differing by 90° of an arc, which is usually a sufficiently close adjustment for most purposes.

It will be understood that any desired number of grooves may be employed depending on the fineness of adjustment required.

To facilitate the operation of the device the key is preferably formed of a tube of non-rusting material such as Monel metal, and is provided with a driver slot 7 at each end. A crank shaped tool 4 is provided having a pin 5 projecting from one end adapted to enter the bore of the key and wings 6 adapted to enter the driver slots of the key. This arrangement enables the operator to readily screw in the key without danger of the tool slipping. With a driver slot at each end of the key the operator does not need to pay any particular attention to his keys when picking them up, as either end may be entered first into the key seat.

It is not essential, however, to so form the key, as a solid key may be used or a key with a slot at one end only.

What I claim is:

1. The combination of a bolt and a nut, one of said parts having grooves formed therein diametrically opposite one another and parallel to the axis of the bolt and the other part; similar grooves at right angles to one another with which the first mentioned grooves may be brought progressively into engagement to form a key seat; and a key adapted to fit said key seat, certain of the grooves and the key being threaded, the pitch of the thread being one-quarter the pitch of the bolt.

2. The combination of a bolt and a nut, having threaded grooves formed therein parallel to the axis of the bolt adapted when brought into co-operative position to form a key seat; a threaded cylindrical key adapted to be screwed into the key seat, a plurality of grooves being formed in each part, the spacing of the grooves in one part being different from the spacing of the grooves in the other part and such that a key seat is formed after equal angular movements of the nut, the pitch of the thread of the key being proportioned to the thread of the bolt as one step of the said movement of the nut is to a complete revolution.

3. The combination of a bolt and a nut, having threaded grooves formed therein parallel to the axis of the bolt adapted when brought into co-operative position to form a key seat; a threaded cylindrical key adapted to be screwed into the key seat, a plurality of grooves being formed in one part, the spacing of the grooves being such that a key seat is formed after equal angular movements of the nut, the pitch of the thread of the key being proportioned to the thread of the bolt as one step of the said movement of the nut is to a complete revolution.

Signed at Toronto, Canada, this 31st day of March, 1926.

RUFUS W. SMITH.